United States Patent
Choi et al.

(10) Patent No.: US 8,055,802 B2
(45) Date of Patent: Nov. 8, 2011

(54) OPEN SERVICE GATEWAY INITIATIVE-BASED HOME GATEWAY APPARATUS AND DEVICE REGISTRATION METHOD THEREOF

(75) Inventors: Moon-jeong Choi, Seoul (KR); Sang-do Park, Gangnam-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1100 days.

(21) Appl. No.: 11/313,615

(22) Filed: Dec. 22, 2005

(65) Prior Publication Data

US 2006/0159110 A1 Jul. 20, 2006

(30) Foreign Application Priority Data

Jan. 17, 2005 (KR) .................. 10-2005-0004285

(51) Int. Cl.
*G06F 15/16* (2006.01)
*H04L 12/28* (2006.01)

(52) U.S. Cl. ........ 709/249; 709/217; 709/220; 709/227; 709/250; 370/401; 370/395.54

(58) Field of Classification Search .................. 709/220, 709/223, 249, 250, 217, 227; 370/401, 395.54
See application file for complete search history.

(56) References Cited

U.S. PATENT DOCUMENTS

| | | | |
|---|---|---|---|
| 6,052,750 A * | 4/2000 | Lea | 710/72 |
| 7,000,012 B2 * | 2/2006 | Moore et al. | 709/220 |
| 7,131,111 B2 * | 10/2006 | Passanisi | 717/121 |
| 7,181,010 B2 * | 2/2007 | Russ et al. | 380/234 |
| 7,231,424 B2 * | 6/2007 | Bodin et al. | 709/204 |
| 7,260,597 B1 * | 8/2007 | Hofrichter et al. | 709/200 |
| 7,392,304 B2 * | 6/2008 | Kang et al. | 709/223 |
| 7,398,305 B2 * | 7/2008 | Bodin et al. | 709/222 |
| 2003/0135560 A1 * | 7/2003 | Bodin et al. | 709/206 |
| 2004/0117494 A1 * | 6/2004 | Mitchell et al. | 709/230 |
| 2005/0015462 A1 * | 1/2005 | Lee et al. | 709/217 |
| 2005/0193119 A1 * | 9/2005 | Hayes, Jr. | 709/227 |
| 2005/0193388 A1 * | 9/2005 | Hayes, Jr. | 717/174 |
| 2005/0210474 A1 * | 9/2005 | Hayes, Jr. | 719/310 |
| 2005/0232283 A1 * | 10/2005 | Moyer et al. | 370/401 |
| 2006/0140144 A1 * | 6/2006 | Bruner et al. | 370/328 |
| 2008/0205419 A1 * | 8/2008 | Shin et al. | 370/401 |

(Continued)

FOREIGN PATENT DOCUMENTS

KR 1020040079472 A 9/2004

OTHER PUBLICATIONS

Global Standardization Activity of OSGi, Ryutaro Kawamura, Jan. 2004.*

(Continued)

*Primary Examiner* — Kamal Divecha
(74) *Attorney, Agent, or Firm* — Sughrue Mion, PLLC (57) ABSTRACT

An OSGi-based home gateway apparatus and a device register method includes a device detecting unit which detects at least one legacy device which does not load a controllable middleware from a plurality of home devices connected to the home network; an outside network interface which receives drive information of the detected legacy device through the outside network; a bundle creating unit which creates a legacy bundle by combining the input drive information and a predetermined network protocol which can be used in the home network; and a device registering unit which registers the created legacy bundle to the OSGi framework.

10 Claims, 5 Drawing Sheets

OTHER PUBLICATIONS

Adminsitratable Wireless Access Point (AWAP), Mathias Faure, 2003.*

Standardization Activity of OSGi, Ryutaro Kawamura and Hiroyuki Maeomichi, NTT Technical Review, vol. 2 No. 1 Jan. 2004, pp. 94-97.*

The connected Home, Jan. 7, 2004, Motorola, pp. 1-21.*

Devices and Services Discovery in Home Networks with OSGi, by Parlin Dobrev et al., IEEE Aug. 2002.*

4DHomeNet. "The OSGi R2 Compliant Home Gateway", www.4dhome.net.

* cited by examiner

OPEN SERVICE GATEWAY INITIATIVE-BASED HOME GATEWAY APPARATUS AND DEVICE REGISTRATION METHOD THEREOF

CROSS-REFERENCE TO RELATED APPLICATION

This application claims the benefit of Korean Patent Application No. 2005-04285, filed on Jan. 17, 2005, in the Korean Intellectual Property Office, the entire content of which is incorporated herein by reference.

BACKGROUND OF THE INVENTION

1. Field of the Invention

Apparatuses and methods consistent with the present invention relate to an open service gateway initiative (OSGi)-based home gateway and a device registration. More particularly, apparatuses and methods consistent with the present invention relate to an OSGi-based home gateway and a device registration adapted to control home electric appliances without recourse to any controllable middleware bundle.

2. Description of the Prior Art

A home network system is a scheme serving as a liaison between a home network and an exterior network and enables an intelligent communication therebetween. Through this network system, home information resources can be shared, and individual home appliances can be maximally utilized.

In order to control the home devices of the home network, an OSGi is used. The OSGi is a standard using a platform independence of Java and a network mobility of the execution code in order to give a dynamic service for a small capacity memory device.

The OSGi is a standard so made as to be operated under a Java Virtual Machine (VM), and the OSGi service is available in a physical package called a "bundle". A plurality of OSGi services are included in one bundle. The bundle forms a basic unit for distribution and management.

Figure 1:
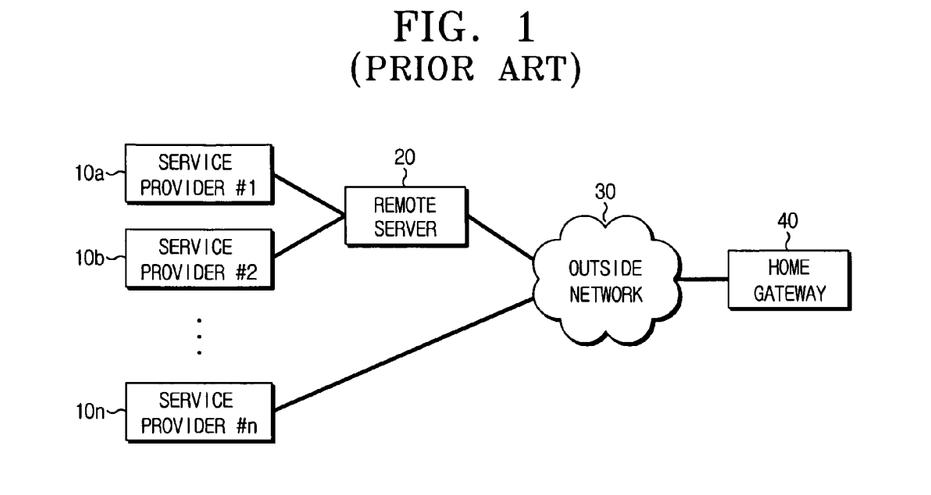
FIG. 1 is a schematic diagram illustrating a transfer process of bundles in a home network system.

FIG. 1 is a schematic diagram illustrating a transfer process of a bundle in a home network system.

Referring to FIG. 1, the home network system includes a remote server 20 communicating through a home gateway 40 and an external network 30, and a plurality of service providers 10a, 10b, . . . 10n.

If the plurality of service providers 10a, 10b, . . . 10n transmit services to a remote server 20, the remote server 20 creates bundles, which enables an install process and an upgrade, with the services from the service providers 10a, 10b, . . . 10n, and provides the bundles to a home gateway 40.

Conventionally, the service providers 10a, 10b, . . . 10n provide services to users through the remote server 20. However, a service provider 10n out of a plurality of service providers may directly provide services to the users by creating bundles by itself and bypassing the remote server 20.

The bundles transmitted by the above process are managed by an OSGi Framework. The OSGi Framework is equipped with a service register to perform a registration, an inquiry, an execution and a deletion with regard to the services.

Figure 2:
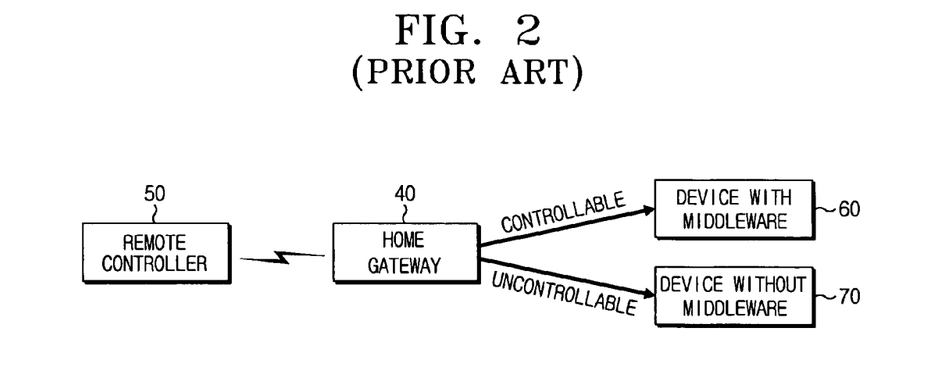
FIG. 2 is a schematic diagram illustrating remote control in the home network system.

FIG. 2 is a schematic diagram illustrating remote control in a home network system.

Home devices can be controlled by an outside remote controller 50. A control signal output by the remote controller 50 is transmitted to relevant devices through the home gateway 40.

As shown in the drawing, the home devices can be classified into a device with a middleware 60, such as Universal Plug and Play (UPnP) which can be provided as a bundle form to the OSGi, and a device without middleware 70.

Since the OSGi service is structured to control devices on a home network from the outside by loading middleware bundles on the OSGi framework, the device with middleware 60 can be controlled by the remote controller 50. However, the device without middleware 70 cannot be controlled by the remote controller 50.

For that reason, both the device with the middleware 60 and the device without middleware 70, cannot be connected and controlled in a network. Thus, in case the device with the middleware 60 and the device without the middleware 70 are connected in a network, a controllable middleware should be added to the device without middleware 70, resulting in excessive cost.

SUMMARY OF THE INVENTION

An aspect of an exemplary embodiment of the present invention is to provide anOSGi-based home gateway apparatus and a device registration method thereof, wherein the home gateway apparatus connecting a home network and an outside network creates appropriate middleware bundles to control home devices without the assistance of middleware with an OSGi protocol.

The OSGi-based home gateway apparatus performs a matching process of a home network and an outside network, and the apparatus comprises a device detecting unit which detects at least one legacy device which does not load any controllable middleware from a plurality of home devices connected to the home network; an outside network interface which receives drive information of the detected legacy device through the outside network; a bundle creating unit which creates a legacy bundle by combining the input drive information and a predetermined network protocol which can be used in the home network; and a device registering unit which registers the created legacy bundle in the OSGi framework.

The device detecting unit may detect the legacy device by using a predetermined discovery protocol, and the discovery protocol may be one of a Dynamic Host Configuration Protocol (DHCP) and an Address Resolution Protocol (ARP).

Here, the device detecting unit includes a device interface unit which provides an interface with the legacy device and receives device information of the detected legacy device through the device interface unit.

The device information includes at least one of a manufacturing company, a model name and a serial number.

In an exemplary embodiment, the outside network interface receives meta data of the detected legacy device through the outside network to send the data to the device detecting unit.

In an exemplary embodiment, the device detecting unit identifies a type of the detected legacy device by the received meta data, and the bundle creating unit determines the predetermined network protocol by the type of the detected legacy device.

In an exemplary embodiment, the drive information includes a driver of the detected legacy device, and the network protocol is one of a Universal Plug and Play (UPnP), a Jini and a Home Audio Video interoperability (HAVi).

In an exemplary embodiment, the apparatus comprises a storing unit which stores a network protocol which is set up as a default among a plurality of network protocols.

A device registration method of an OSGi-based home gateway apparatus of an exemplary embodiment of the present invention, which performs a matching process of a home network and an outside network, comprises: detecting at least one legacy device, which does not load a controllable middleware, from a plurality of home devices connected to the home network; receiving drive information of the detected legacy device through the outside network; creating a legacy bundle by combining the input drive information and a predetermined network protocol which can be used in the home network; and registering the created legacy bundle to the OSGI framework.

In the device detection, the legacy device may be detected by using a predetermined discovery protocol and the discovery protocol is one of a DHCP and an ARP.

In the legacy device detection, device information is received from the detected legacy device. The device information includes at least one of a manufacturing company, a model name and a serial number.

The method may further comprise receiving the meta data of the detected legacy device through the outside network and identifying a type of the legacy device following the detection of the legacy device.

Increating the legacy bundle, the predetermined network protocol is determined by the type of the detected legacy device.

In an exemplary embodiment, the drive information comprises a driver of the deleted legacy device, and the network protocol is one of a UPnP, a Jini and a HAVi.

In an exemplary embodiment, the bundle creation comprises identifying a predetermined network protocol used in the home network; selecting the identified network protocols from a plurality of network protocols; and creating the legacy bundle by combining the received drive information and the selected network protocol.

DESCRIPTION OF THE EXEMPLARY EMBODIMENT

Hereinafter, an exemplary embodiment of the present invention will be described in detail with reference to the drawings.

Figure 3:
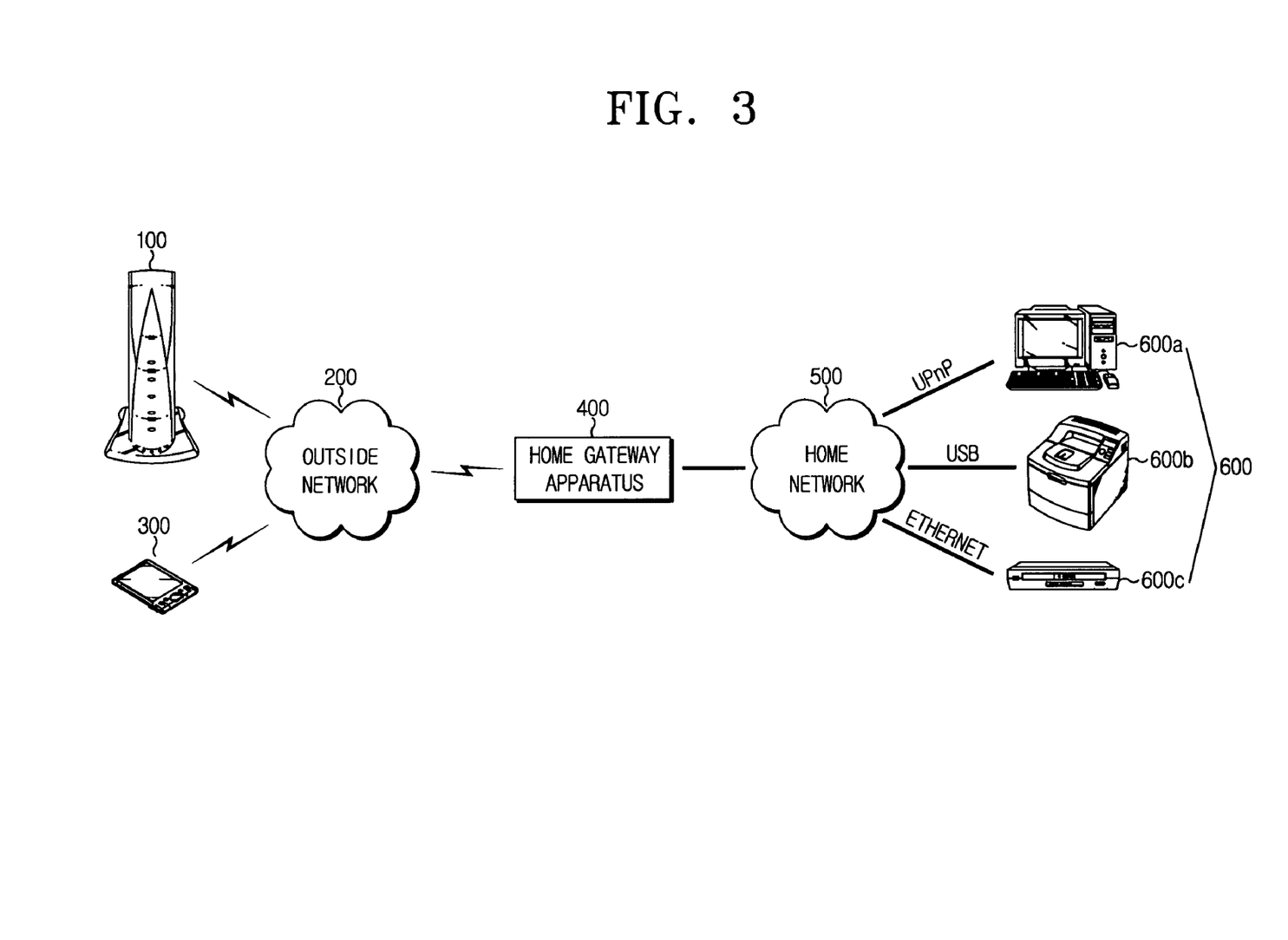
FIG. 3 is a schematic diagram illustrating a home network system of an exemplary embodiment of the present invention.

FIG. 3 is a schematic diagram illustrating a home network system according to an exemplary embodiment of the present invention.

The home network system according to an exemplary embodiment of the present invention comprises a service-providing server 100 and a remote controller 300 which are connected to a home gateway apparatus 400 through an outside network 200 and a plurality of home devices 600 which are connected to the home gateway apparatus 400 through the home network 500.

A service-providing server 100 provides various services to the home gateway apparatus 400 through the outside network 200. Here, the service provided by the service-providing server 100 may be in a form of a bundle capable of installation and upgrading.

The remote controller 300 transmits various control signals, which are made by manipulation of a user through the outside network 200 to the home gateway apparatus 400. Here, the remote controller 300 may be a portable wireless terminal device such as a mobile phone and a Personal Digital Assistant (PDA) and the like and a wire terminal device, such as a desktop personal computer (PC) and a laptop PC.

The home gateway apparatus 400 performs a matching process of the home network 500 and the outside network 200. The OSGi framework of the home gateway apparatus 400 is provided with middleware bundles used in the home network 500. The home gateway apparatus 400 will be described in more detail with reference to FIG. 4 (to be described later).

The home devices 600 are connected to the home gateway apparatus 400 via home network 500 to be controlled by the remote controller 300. Although in the present exemplary embodiment, a PC 600a, a printer 600b and a DVD player 600c are given as examples, the home devices are not limited to these examples. For example, a notebook, an Access Point (AP), a digital TV and a digitalized refrigerator may be included in the exemplary embodiment, and all next generation home electric appliances, which form a network to perform mutual data communication, may be included.

Figure 4:
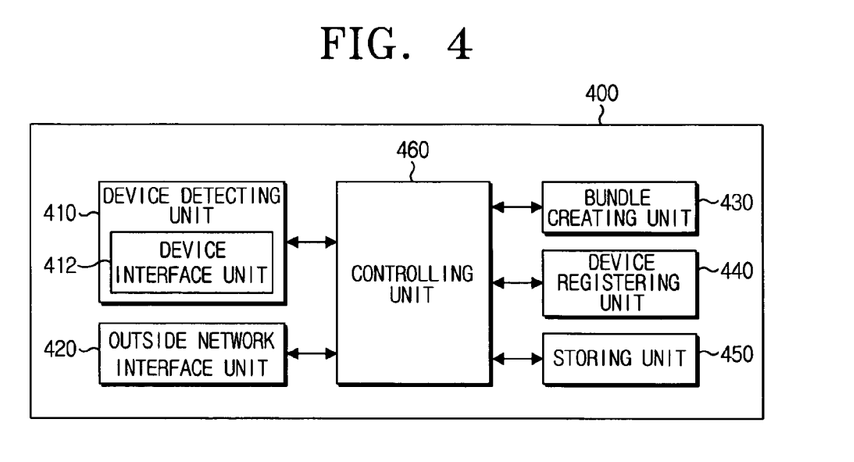
FIG. 4 is a block diagram of the home gateway apparatus according to an exemplary embodiment of the present invention.

FIG. 4 is a block diagram of the home gateway apparatus according to an exemplary embodiment of the present invention.

As is well known, the home gateway apparatus 400 is a major component of OSGi which is a platform standard for various services. The home gateway apparatus 400 enables a voice communication, a data communication, an Internet and a multimedia communication in the home, the office and other various places. Also, the home gateway apparatus provides more powerful capabilities in association with management.

The home gateway apparatus 400 according to an exemplary embodiment of the present invention includes a device detecting unit 410, an outside network interface unit 420, a bundle creating unit 430, a device registering unit 440, a storing unit 450, and a controlling unit 460.

The device detecting unit 410 operates to detect at least one legacy device which does not load any controllable middleware, from the plurality of home devices 600. In an exemplary embodiment, the device detecting unit 410 detects the legacy device by using a discovery protocol such as a DHCP and an ARP.

Conventionally, the DHCP is a protocol which allows network managers to manage and allocate Internet Protocol (IP) addresses on the network, and the ARP is a protocol which is used to correspond IP addresses to physical network addresses on an IP network.

With FIG. 3 given as an example, the PC 600a connected via a UPnP to the home gateway apparatus 400, loads the UPnP. A printer 600b and a DVD player 600c connected through a local network, such as a Universal Serial Bus (USB) and an Ethernet, to the home gateway apparatus 400 have no controllable middleware. Here, the printer 600b and the DVD player 600c, without the controllable middleware, are called legacy devices.

A device detecting unit 410 includes a device interface unit 412 which provides an interface with the legacy devices 600*b*, 600*c*. In case the legacy devices 600*b*, 600*c* are detected by the device detecting unit 410, the device interface unit 412 of the present exemplary embodiment receives device information from the detected legacy device 600*b*, 600*c*. Here, the device information may include at least one of a manufacturing company, a model name and a serial number of the legacy devices 600*b*, 600*c*.

In addition, the device detecting unit 410 discriminates types of the devices by meta data corresponding to the legacy devices 600*b*, 600*c* and provides the confirmed types of the devices to the bundle creating unit 430.

An outside network interface unit 420 provides an interface with an outside network 200, and receives drive information of the legacy devices 600*b*, 600*c* detected by the device detecting unit 410 through the outside network 200 from the service providing server 100. Here, the drive information may include a driver and a device control protocol of the legacy devices 600*b*, 600*c* and the like.

In addition, the outside network interface unit 420 transmits a signal requesting meta data to the service providing server 100 if necessary, and the interface unit receives the requested meta data to transmit to the device detecting unit 410.

The bundle creating unit 430 discriminates a network protocol which can be used in the home network 500, and combines the drive information of the legacy device 600*b*, 600*c* and a predetermined network protocol to create a legacy bundle. Here, the network protocol may be one of the home network middleware such as a UPnP, a Jini and a HAVi. In the home network 500, a network protocol or a plurality of network protocols may be used.

The legacy bundle created by the bundle creating unit 430 is controlled by an OSGi framework similar to the existing middleware bundles. The bundles managed by the OSGi framework will be described in detail with reference to FIG. 5 (to be described later).

A device registering unit 440 registers a legacy bundle created by a bundle creating unit 430 in the OSGi framework, and sets up a control environment so as to be made controllable by the remote controller 300.

A storing unit 450 stores a network protocol established as a default out of the plurality of network protocols. When the bundle creating unit 430 needs to use a network protocol set up as a default during creation of the legacy bundle, the network protocol stored in the storing unit 450 is provided to the bundle creating unit 430. p Furthermore, the storing unit 450 can store meta data and drive information of the legacy devices 600*b*, 600*c*.

A controlling unit 460 controls the overall functions of the device detecting unit 410, the device interface unit 412, the outside network interface unit 420, the bundle creating unit 430, the device registering unit 440 and the storing unit 450.

After the device detecting unit 410 detects the legacy devices 600*b*, 600*c*, the controlling unit 460 discriminates whether the meta data and drive information corresponding to the detected legacy device 600*b*, 600*c* are stored in the storing unit 450. In case the corresponding drive information and meta data are not stored in the storing unit 450, the controlling unit 460 can control a signal for requesting the drive information and meta data so as to be sent to the service providing server 100 through the outside network interface unit 420.

Figure 5:
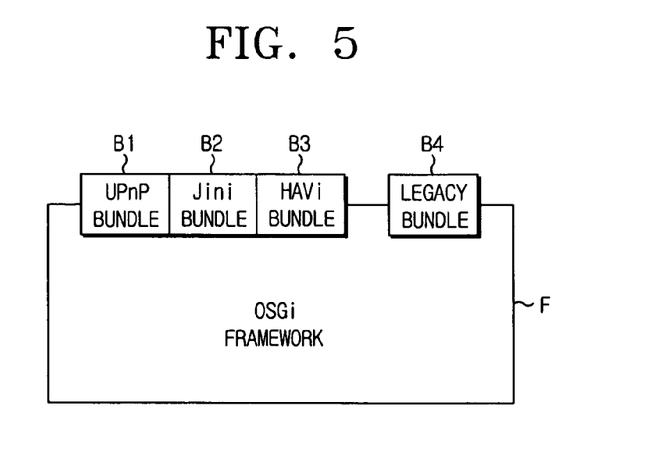
FIG. 5 is a schematic diagram illustrating bundles created in the home gateway apparatus of an exemplary embodiment of the present invention.

FIG. 5 is a schematic diagram illustrating bundles created in the home gateway apparatus according to an exemplary embodiment of the present invention.

With reference to FIG. 5, the OSGi framework F is provided with bundles corresponding to the plurality of network protocols. For example, the framework is provided with an UPnP bundle B1, a Jini bundle B2, a HAVi bundle B3, and the framework also has a legacy bundle B4 created by the bundle creating unit 430. Accordingly, the remote controller 300 is capable of controlling the legacy devices 600*b*, 600*c* via the OSGi-based home gateway apparatus according to an exemplary embodiment of the present invention.

Figure 6:
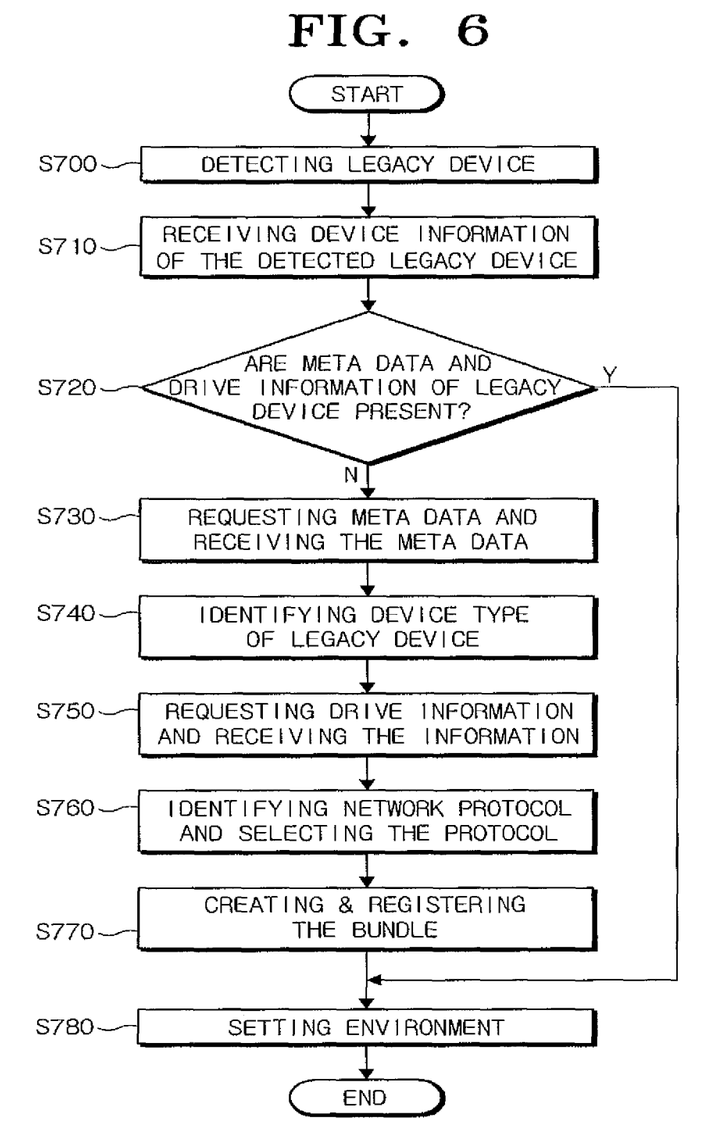
FIG. 6 is a flow chart which describes a device registering method of the OSGi-based home gateway apparatus according to an exemplary embodiment of the present invention.

FIG. 6 is a flow chart which describes a device registering method of the OSGi-based home gateway apparatus of an exemplary embodiment of the present invention. Here, the device registering method is described with reference to FIGS. 3 to 6.

In a first operation, the device detecting unit 410 detects legacy devices connected to the home network 500. In other words, the device detecting unit 410 detects the legacy devices 600*b*, 600*c* connected through a USB or an Ethernet from the home devices 600 connected to the home network 500 (S700). Here, the device detecting unit 410 is capable of using any one of the discovery protocols such as DHCP, ARP and the like.

After the legacy devices 600*b*, 600*c* are detected by the device detecting unit 410, the legacy devices 600*b*, 600*c* transmit their own device information to the home gateway apparatus 400 through each network (e.g., via USB or Ethernet), and the device information transmitted from the legacy devices 600*b*, 600*c* is input to the device detecting unit 410 via the device interface unit 412 (S710).

The controlling unit 460 discriminates whether the meta data and drive information of the detected legacy devices are included in the storing unit 450 (S720). When the controlling unit 460 determines that the meta data and the drive information are not included, the controlling unit controls the device interface unit 412 and sends a request signal to the meta data. p The meta data request signal transmitted from the device interface unit 412 is transmitted to the service providing server 100, and when the service providing server 100 transmits the corresponding meta data, the device interface unit 412 receives the data (S730).

The device detecting unit 410 checks the device type of the legacy devices 600*b* and 600*c* in response to the meta data received via the device interface unit 412 (S740).

The controlling unit 460 controls the device interface unit 412 so as to transmit a signal requesting the drive information. The device interface unit 412 is connected to the service providing server 100 to request the drive information, and receives the drive information provided from the service providing server 100 (S750).

The bundle creating unit 430 discriminates a network protocol which can be used in the home network 500, and selects one of the identified network protocols (S760). Furthermore, the bundle creating unit 430 creates a legacy bundle B4 by combining the drive information with the selected network protocol, and registers the created legacy bundle B4 in the OSGi framework F (S770).

Successively, the controlling unit 460 sets up a control environment to allow the remote controller 300 to control the legacy devices 600*b*, 600*c* via the home gateway apparatus 400 according to an exemplary embodiment of the present invention.

Figure 7:
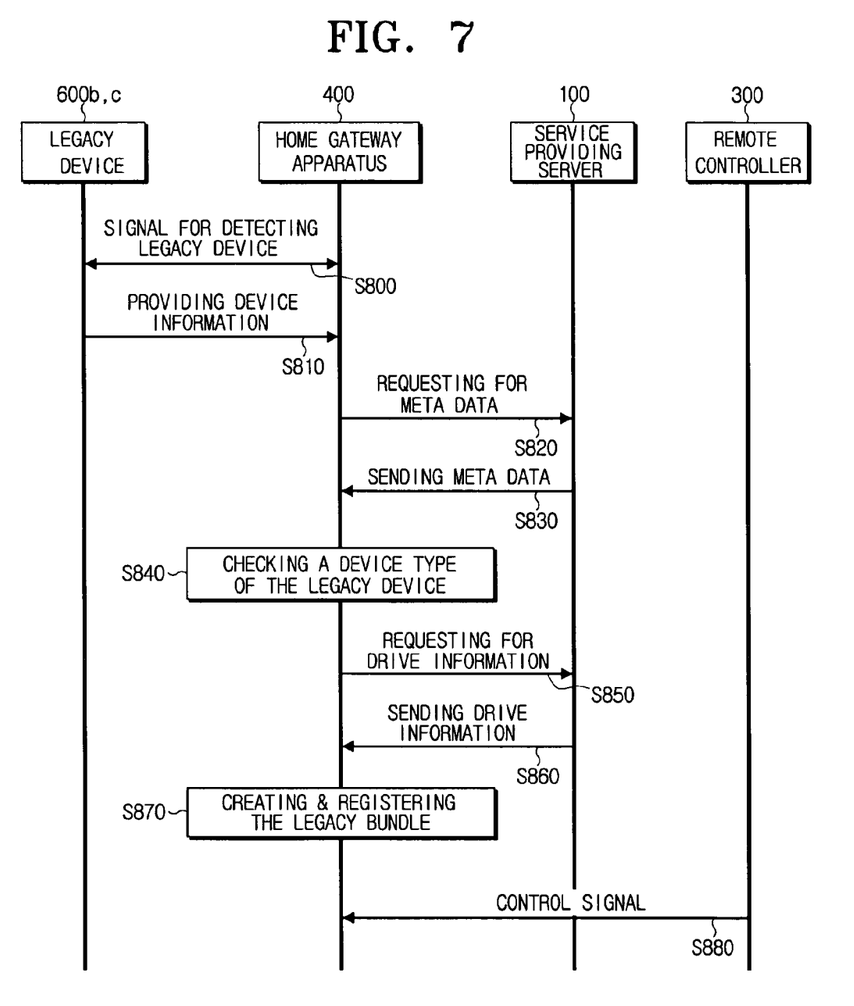
FIG. 7 is a flow chart which describes a signal flow in the home network system according to an exemplary embodiment of the present invention.

FIG. 7 is a flow chart which describes a signal flow in the home network system according to an exemplary embodiment of the present invention. Here, the signal flow is described with reference to FIGS. 3 to 7.

The home gateway apparatus 400 tries to detect the legacy devices 600*b*, 600*c* by using discovery protocols such as DHCP and ARP, and the legacy devices 600*b*, 600*c* notify the home gateway apparatus 400 of their existence, and provide their device information to the home gateway apparatus 400 (S800 to S810).

The home gateway apparatus 400 requests the service providing server 100 of the meta data (S820), and the service providing server 100 having received the request for the meta data provides a corresponding meta data to the home gateway apparatus 400 (S830).

The home gateway apparatus 400 having received the meta data from the service providing server 100 checks the device type of the legacy devices 600*b*, 600*c* by way of the meta data (S840).

The home gateway apparatus 400 requests the drive information of the legacy devices 600*b*, 600*c* from the service providing server 100 (S850), and the service providing server 100 having received the request for the drive information provides a corresponding drive information to the home gateway apparatus 400 (S860).

Next, the home gateway apparatus 400 creates a legacy bundle by combining the drive information with a default network protocol or a predetermined network protocol which can be used in the home network 500, and the home gateway apparatus 400 registers the created legacy bundle B4 in the OSGi framework F (S870).

The remote controller 300 transmits a predetermined control signal to the home gateway apparatus 400 by the manipulation of the user, and this control signal is transmitted to the corresponding legacy devices 600*b*, 600*c* through the home gateway apparatus 400 (S880).

Through the process thus described, the OSGi framework F of the home gateway apparatus 400 is provided with a new legacy bundle B4, such that the remote controller 300 can control the legacy devices 600*b*, 600*c*.

As apparent from the foregoing, the OSGi-based home gateway and device registration method according to an exemplary embodiment of the present invention can create an appropriate middleware bundle according to a legacy device in the home gateway apparatus which performs a network-matching process between the home network and the outside network, thereby providing an advantage of controlling the legacy device with the OSGi protocol by way of the remote controller.

Furthermore, the exemplary embodiment of the present invention has an advantage of working regardless of the kind of the legacy device by receiving meta data and drive information of the legacy device through the outside network, and the present invention can include existing home devices without having any separate additional structure.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An Open Service Gateway Initiative (OSGi)-based home gateway apparatus which performs a matching process of a home network and an outside network, the apparatus comprising:
    a storing device which stores information of at least one legacy device;
    a device detecting unit which detects the legacy device, which does not load a controllable middleware and does not have any controllable middleware, from a plurality of different types of home devices connected to the home network, wherein the plurality of different types of home devices are based on a plurality of different network protocols and wherein the controllable middleware enables a remote controller located on the outside network to control the legacy device;
    an outside network interface which receives drive information of the detected legacy device through the outside network;
    a device interface unit which provides an interface with the detected legacy device and receives device information of the detected legacy device;
    a bundle creating unit which creates a legacy bundle by combining the received drive information and a predetermined network protocol which can be used in the home network;
    a device registering unit which registers the created legacy bundle in an OSGi framework; and
    a controlling unit which discriminates whether meta data and drive information of the detected legacy device are stored in the storing device, and, if not, controls the outside network interface to request the meta data and the drive information to a service providing server located on the outside network,
    wherein the device detecting unit discriminates a type of the detected legacy device by using the meta data of the detected legacy device and provides the discriminated type of the legacy device to the bundle creating unit, the bundle creating unit determines the predetermined network protocol based on the discriminated type of the detected legacy device and creates the legacy bundle using the drive information received from the service providing server and the determined network protocol, and the registered legacy bundle enables a remote controller to control the legacy device through the OSGi-based home gateway apparatus,
    wherein the drive information comprises a driver of the detected legacy device and wherein the network protocol is one of a Universal Plug and Play (UPnP), a Jini and Home Audio Video interoperability (HAVi).

2. The apparatus of claim 1, wherein the device detecting unit detects the legacy device by using a predetermined discovery protocol.

3. The apparatus of claim 2, wherein the discovery protocol is one of a Dynamic Host Configuration Protocol (DHCP) and an Address Resolution Protocol (ARP).

4. The apparatus of claim 1, wherein the device information comprises at least one of a manufacturing company, a model name and a serial number.

5. The apparatus of claim 1, wherein the storing unit further stores a network protocol which is set up as a default among a plurality of network protocols.

6. A device registration method of an OSGi-based home gateway apparatus which performs a matching process of a home network and an outside network, the method comprising:
    detecting, by the OSGi-based home gateway apparatus, at least one legacy device which does not load a controllable middleware and does not have any controllable middleware, from a plurality of different types of home devices connected to the home network, wherein the plurality of different types of home devices are based on a plurality of different network protocols and wherein the controllable middleware enables a remote controller located on the outside network to control the legacy device;
    receiving, by the OSGi-based home gateway apparatus, device information from the detected legacy device;

discriminating, by the OSGi-based home gateway apparatus, whether meta data and drive information of the detected legacy device are pre-stored and if not, requesting the meta data to a service providing server located on the outside network;

when the requested meta data is received, checking, by the OSGi-based home gateway apparatus, a device type of the detected legacy device based on the received meta data;

determining, by the OSGi-based home gateway apparatus, a network protocol which can be used in the home network based on the checked device type;

requesting, by the OSGi-based home gateway apparatus, drive information corresponding to the checked device type to the service providing server;

receiving, by the OSGi-based home gateway apparatus, the drive information of the detected legacy device through the outside network;

creating, by the OSGi-based home gateway apparatus, a legacy bundle by combining the received drive information and the determined network protocol; and registering, by the OSGi-based home gateway apparatus, the created legacy bundle to an OSGi framework, wherein the registered legacy bundle enables a remote controller to control the legacy device through the OSGI-based home gateway apparatus, wherein the drive information comprises a driver of the detected legacy device and wherein the network protocol is one of a Universal Plug and Play (UPnP), a Jini and Home Audio Video interoperability (HAVi).

7. The method of claim 6, wherein in the device detection, the legacy device is detected by using a predetermined discovery protocol.

8. The method of claim 7, wherein the discovery protocol is one of a DHCP and an ARP.

9. The method of claim 6, wherein the device information comprises at least one of a manufacturing company, a model name and a serial number.

10. The method of claim 6, wherein the bundle creation comprises:

identifying the network protocol used in the home network;

selecting the identified network protocol from a plurality of network protocols; and creating the legacy bundle by combining the received drive information and the selected network protocol.

* * * * *